United States Patent [19]
Fassy et al.

[11] B 3,923,764
[45] Dec. 2, 1975

[54] ADJUVANT FOR IMPROVING THE POLYMERISATION OF ETHYLENE-HYDROCARBONS

[75] Inventors: Henri Fassy, Jurancon; Philippe Lalet, Orthez; Andre Miletto, Pau, all of France

[73] Assignee: Societe Anonyme Ato Chimie, Paris, France

[22] Filed: Dec. 11, 1972

[21] Appl. No.: 314,255

[44] Published under the Trial Voluntary Protest Program on January 28, 1975 as document no. B 314,255.

[30] Foreign Application Priority Data
Dec. 9, 1971 France ............................. 71.44175

[52] U.S. Cl. ......... 260/92.8 R; 260/80 C; 260/89.1; 260/89.5 A; 260/93.5 R; 260/94.9 R
[51] Int. Cl.² ... C08F 2/02; C08F 4/40; C08F 14/06
[58] Field of Search .................... 260/92.8 R, 94.9 R

[56] References Cited
UNITED STATES PATENTS

| | | |
|---|---|---|
| 3,520,867 | 7/1970 | Lo Monaco et al. .......... 260/92.8 R |
| 3,637,622 | 1/1972 | Lo Monaco et al. .......... 260/92.8 R |
| 3,644,317 | 2/1972 | Lo Monaco et al. .......... 260/92.8 R |

OTHER PUBLICATIONS
Chemical Abstracts, 31, 6956 (1937).
Chemical Abstracts, 54, 14754g (1960).

*Primary Examiner*—Joseph L. Schofer
*Assistant Examiner*—A. Holler
*Attorney, Agent, or Firm*—Ostrolenk, Faber, Gerb & Soffen

[57] ABSTRACT

The invention relates to an adjuvant to a catalyst system for polymerising ethylene, more particularly vinyl, hydrocarbons.

The adjuvant is a nitrogenous substance such as an amide, ammonia or an ammonia compound liberating ammonia in the reaction medium; it is added together with sulphur dioxide or an $SO_2$-liberating compound to the monomer containing a hydroperoxide and/or organic peracid catalyst.

The polymers, which are obtained with an improved conversion rate, have very good characteristics and are suitable, e.g., for the manufacture of rigid sectional members, hot-water piping and various building components.

12 Claims, No Drawings

ADJUVANT FOR IMPROVING THE POLYMERISATION OF ETHYLENE-HYDROCARBONS

The invention relates to an improvement to the polymerization of vinyl hydrocarbons, and more particularly ethylene hydrocarbons. It relates to an adjuvant for improving the preparation of polymers, more particularly vinyl chloride polymers. The invention also relates to a novel catalyst system for carrying out the aforementioned polymerization operations.

The preparation of polymers in the presence of catalysts producing free radicals, inter alia peroxides, is performed on a very large scale in industry and has been improved, more particularly in relation to vinyl compounds, by using redox systems. For example, peroxides have been used in combination with reducing agents such as sulphur dioxide, either alone or with various compounds. Experience has shown, however, that this method is not suitable in all cases, particularly in the bulk polymerisation of vinyl chloride at low temperature. To this end, a search has been made for other adjuvants and it has been shown that alkali-metal, alkaline-earth-metal or aluminum alcoholates, when added to an organic hydroperoxide in the presence of $SO_2$, considerably improve polymerisation and modify the properties of the polymer obtained. In spite of the prior art, there are still some defects to be obviated, particularly relating to the conversion rate and the suitability of the polymers for conversion.

The invention relates to an improvement in the polymerisation of ethylene, more particularly vinyl, hydrocarbons, in the presence of a redox system comprising a hydroperoxide or a peracid and $SO_2$ or an $SO_2$-liberating derivative. It provides a higher conversion rate of polymer and the product has a better conversion aptitude than the products obtained by prior-art methods. The invention can yield polyvinyl chloride, at a conversion rate of the order of 15 percent, having a syndiotacticity index which may exceed 2.2, and the other properties of which (e.g., the vitreous transformation point, the thermal stability, or the Vicat point) are excellent compared with the best prior-art products.

The polymer, more particularly polyvinyl chloride, obtained by the method according to the invention, contains sulphonic-$SO_3H$ groups, more particularly one or more —$SO_3H$ groups per chain. When polymerisation is performed at a relatively low temperature, the vinyl polymer is syndiotactic.

The novel method according to the invention for polymerisation in the presence of a hydroperoxide and/or organic peracid and sulphur dioxide or an $SO_2$-liberating compound, is characterised in that one or more amides, ammonia and/or ammonia-liberating compounds are also added to the reaction medium.

The amides most suitable for performing the method according to the invention are amides of alkali metals or alkaline-earth metals, e.g., sodium, potassium, lithium, calcium or barium amides. Very advantageously, sodium amide $NaNH_2$ is used, since it is most easily available industrially.

Anhydrous ammonia may be used alone, or alternatively various compounds thereof may be used, more particularly compounds capable of liberating $NH_3$ in the reaction medium, e.g. ammonia sulphite or other easily-dissociable ammonium salts. Among the various ammonia compounds, use may advantageously be made of derivatives such as ammonium, alkali-metal or alkaline-earth-metal amido-sulphinates, e.g. sodium amido-sulphinate:

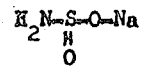

which already contains the required $SO_2$. Alternatively, use can be made of $SO_2$—$NH_3$ complexes, which, as is known, form in an anhydrous medium such as methanol. A known complex of this kind has the formula $NH_4(NH_2SO_2)$.

The nitrogenous amide or ammoniated adjuvants according to the invention can be introduced into the reaction medium either alone or in solution in a suitable solvent. Aliphatic alcohols, more particularly those containing between 1 and 5 carbon atoms in anhydrous form, are good vehicles for the adjuvants; anhydrous methanol is particularly suitable. Of course, the solvent used should not adversely effect the polymerisation process; the aforementioned anhydrous alcohols satisfy this condition. Incidentally, if alcohol is present in the reaction medium containing $SO_2$ and a hydroperoxide or peracid, the resulting polymer tends to contain a certain proportion of sulphone or —$SO_2$—groups, but such groups do not occur in a polymer prepared in the presence of a nitrogenous adjuvant according to the invention, even when introduced in the form of an alcoholic solution. This is an additional advantage in the use of amides and ammonia or $NH_3$—liberating substances; it is known that the polymers have low thermal stability if sulphone groups are present. To ensure that the nitrogenated adjuvant has an optimum effect, its content in the reaction medium should be in suitable proportion to the content of $SO_2$. Preferably 0.5 to 5, more particularly 1 to 3 mols of nitrogenous adjuvant are used per mol of $SO_2$. In the case of sodium amide or ammonia at temperatures of the order of —30°C, the optimum proportion is 2 mols of nitrogenous compound per mol $SO_2$.

The content of nitrogenous adjuvant in the reaction medium is usually of the order of $5 \times 10^{-4}$ to $5 \times 10^{-3}$ mols per mol of initial monomer.

In the particularly important case of the polymerisation or copolymerisation of vinyl chloride, the other constituents of the catalyst system are in the preferred molar ratios $SO_2/ROOH$ of 0.5 to 10, more particularly 1 to 3, the total quantity by weight of $SO_2$ not exceeding 1 percent of the weight of monomer, thus avoiding excess heating of the medium.

The preferred total concentration of the catalyst system is between 0.01 and 3 percent, more particularly 0.05 and 0.5 percent, by weight with respect to the monomer.

Although the use of hydroperoxides and organic peracids is known in the prior art and most of the last-mentioned compounds are known to be active in polymerisation and can be used according to the invention, it should be noted that the most suitable compounds are the following: hydroperoxides such as $ROOH$ in which the radical $R$ is a straight-chain or branched-chain alkyl radical, a cyclo-alkyl, aryl or aryl-alkyl radical, more particularly hydroperoxides wherein the alkyl group $R$ contains from 1 to 6 carbon atoms, cyclohexyl hydroperoxide or an alkyl-phenyl hydroperoxide wherein the straight-chain or branched-chain alkyl radical contains 1 to 6 carbon atoms, as is more particularly the case with cumyl hydroperoxide.

The organic peroxides used can be RCO—OOH mono-acids wherein the radical R is a straight-chain or branched chain in alkyl, cycloalkyl, aryl or aralkyl group, such as perlauric acid, perbenzoic acid, etc.; alternatively use may be made of diacids having only one peroxygenated acid group, e.g., monoperphthalic acid.

Preferably, polymerisation is performed in the absence of oxygen, which inhibits the process. Accordingly, the air should be flushed out of the reactors used, by a stream of an inert gas, more particularly nitrogen.

Although the rest of the percent description refers mainly to the bulk polymerisation of vinyl chloride, the invention also applies to poymerisation in suspension in a substantially anhydrous liquid such as alcohol. An ethgylene, more particularly vinyl, hydrocarbon can be polymerised according to the invetion in a suspension medium comprising, e.g., one or more aliphatic alcohols containing from 1 to 7 carbon atoms or in aliphatic hydrocarbons containing from 3 to 12 carbon atoms.

The method according to the invention can be performed at temperatures of the order of of −70° to +to 100°C, more particularly between − 50° and + 40°C. In the particular case of vinyl chloride, the preferred temperatures vary from − 50 to 0°C, more particularly from − 40° to + 10°C.

The ethylene hydrocarbons which can be advantageously polymerised by the improved method according to the invention include, more particularly, vinyl chloride and monomers such as styrene, vinyl acetate, vinylidene chloride, acrylonitrile, acrylamide, acrylic ethylene, methacrylic acid, various acrylates or methacrylates, etc., but this list invention in no way limitative.

The invention will be non-limitatively illustrated by the following examples. The examples show various properties of the resulting polymer, including the following:

The ISO index, determined to standard R 174;

The syndiotacticity index by infrared spepctrophotometry for the C—Cl lines at 615 and 690 cm$^{-1}$ (ratio between the intensities of these two lines);

The Tg vitreous transformation point, measured with a Dupont 900 apparatus by the purely thermal method (J.P.S. 56,226–231, 1962 and J.A.P.S. 9,3359–3382, 1965).

The polymers prepared according to the invention are suitable for numerous applications, such as the manufacture of rigid sectional members and various building components. Since they are resistant to heat, they can be used at elevated temperatures, e.g., as hot-water pipes.

EXAMPLE 1

0.421 g of $SO_2$ (0.658×10$^{-2}$ mols) in solution in approx. 5 ml anhydrous methanol followed by 0.513 g of $NaNH_2$ (1.35×10$^{-2}$ mols) likewise in solution in 5 ml anhydrous methanol cooled to −10°C was successively introduced into a 2-litre stainless steel reactor having a double jacket. After the reactor had been sealed the temperature was progressively lowered to − 30°C. The interior of the reactor was flushed by a stream of dry nitrogen, after which 500 g of monomeric vinyl chloride were introduced and the contents of the reactor were agitated at 200 r.p.m.

After the temperature had become stable, 0.5 g of cumyl hydroperoxide in solution in 45 ml anhydrous methanol was continuously injected for 90 minutes using a proportioning pump. The contents of the reactor, which was maintained at −30°C, were agitated for a further 4 hours, after which 80 ml of a 50/50 mixture of methanol and water were injected into the reactor. The contents were re-heated to room temperature and outgassed.

125 g of white polyvinyl chloride was thus obtained, equivalent to a conversison rate of 25 percent.

The polymer had an ISO index of 332 (K. Wert : 104) and a syndiotacticity index of 2.25.

EXAMPLE 2

The method was the same as in Example 1, except that the amount of sodium amide was reduced to 0.256 g, i.e., 0.865 × 10$^{-2}$ mols. Under these conditions, the conversion rate fell to 7.4 percent.

EXAMPLE 3

The method and proportions were the same as in Example 1, except that the quantity of sodium amide was changed to 0.769 g, i.e., 1.972 × 10$^{-2}$ mols. The conversion rate was then 20 percent. Examples 1 to 3 are summarized in the following table:

|  | 1 | 2 | 3 |
|---|---|---|---|
| $NaNH_2$ (grams) | 0.513 | 0.256 | 0.769 |
| % conversion rate | 25 | 7.4 | 20 |
| ISO index | 332 | 172 | 410 |
| K. Wert | 104 | 80 | 111 |
| $NaNH_2SO_2$ molar ratio | 2 | 1 | 3 |

EXAMPLE 4

500 g of vinyl chloride in the presence of 0.5 g cumyl hydroperoxide at −30°C were polymerised in the same apparatus as used in the preceding examples. Before polymerisation began, 0.224 g $NH_3$ and 0.421 g $SO_2$ in solution in anhydrous methanol ($NH_3/SO_2$ molar ratio equals 2) were injected into the reactor. The polymerisation lasted 5.25 hours. The conversion rate was 8 percent.

EXAMPLE 5

The proportions of reagents were the same as in Example 4, except that the methanolic $NH_3$ and $SO_2$ solution was continuously injected into the reactor during the first 1.5 hours of polymerisation. The total duration of polymerisation was 5.5 hours.

The resulting conversion rate was 15 percent, showing that the results are better when the nitrogeous adjuvant and $SO_2$ are continuously introduced into the reaction medium during polymerisation.

EXAMPLLE 6

The method was the same as in Example 5 and the total duration was 5.5 hours as before, except that the $NH_3 + SO_2$ + methanol mixture was injected for only 1 hour. The conversion rate was 11.6 percent. The results of Examples 4 to 6 are summarized in the following table:

| | 4 | 5 | 6 |
| --- | --- | --- | --- |
| Introduction of $NH_3+SO_2$ | at the beginning | Continuously for 1.5 h. | Continuously for 1 hour |
| Duration of polymerisation | 5.25 hrs | 5.5 hrs | 5.5 hrs |
| % conversion | 8 | 15 | 11.6 |
| K. Wert | 79 | 100 | 76 |
| Tg vitreous transformation point | 82 | 94 | 84 |
| Syndiotacticity index | 2.26 | 2.08 | 2.16 |

When ammonia is replaced by the same number of mols of sodium ethanolate (0.895 g), which is recommended in the prior art as an adjuvant for improving the hydroperoxide + $SO_2$ catalyst system, (e.g., in B.F. No. 1 561 107) and all the other operating conditions remain the same, the conversion rate is 8.2 percent compared with 11.6 and 15 percent in Examples 6 and 5 respectively.

We claim:

1. In a process of polymerizing an ethylene hydrocarbon or vinyl chloride employing a redox catalyst, wherein one component of said redox catalyst is a hydroperoxide, organic peracid or mixture thereof and the other component is $SO_2$ or an $SO_2$ liberating compound, the improvement which comprises additionally employing an adjuvant selected from the group consisting of alkali metal amide, alkaline earth metal amide, alkali metal amido-sulfinate, alkaline earth metal amido-sulfinate, ammonium sulfite, and mixtures thereof.

2. The process of claim 1 wherein the amount of adjuvant is $5 \times 10^{-4}$ to $5 \times 10^{-3}$ mols per mol of monomer and 0.5 to 5 mols per mol of $SO_2$, and wherein the amount of total catalyst is 0.01–3 percent based on the weight of the monomer.

3. The process of claim 2 wherein the amount of adjuvant is 1–3 mols per mol of $SO_2$ and wherein the amount of total catalyst is 0.05–0.5 percent.

4. The process of claim 1 wherein said monomer is vinyl chloride, wherein the molar ratio of $SO_2$ to hydroperoxide is 0.5–10 and $SO_2$ is not more than 1 percent based on the weight of the vinyl chloride.

5. The process of claim 4 wherein said molar ratio is 1–3.

6. The process of claim 4 wherein said adjuvant is sodium amide.

7. In a process of polymerizing an ethylene hydrocarbon or vinyl chloride employing a redox catalyst, wherein one component of said redox catalyst is a hydroperoxide, organic peracid or mixture thereof, and the other component is $SO_2$ or an $SO_2$ liberating compound, the improvement which comprises additionally employing sodium amide as an adjuvant.

8. The process of claim 7 wherein said monomer is vinyl chloride, the total amount of catalyst is 0.01–3 percent based on the weight of the monomer, the molar ratio of $SO_2$ to hydroperoxide is 0.5–10, the amount of $SO_2$ is not greater than 1 percent based on the weight of the vinyl chloride monomer, and said adjuvant is used in an amount of 0.5–5 mols per mol of $SO_2$.

9. The process of claim 8 where in the amount of total catalyst is 0.05–0.5 percent, the molar ratio is 1–3 and the amount of adjuvant is 1–3 mols per mol of $SO_2$.

10. The process of claim 7 wherein the amount of adjuvant is $5 \times 10^{-4}$ to $5 \times 10^{-3}$ mols per mol of monomer and 0.5 to 5 mols per mol of $SO_2$, and wherein the amount of total catalyst is 0.01–3 percent based on the weight of the monomer.

11. The process of claim 10 wherein the amount of adjuvant is 1–3 mols per mol of $SO_2$ and wherein the amount of total catalyst is 0.05–0.5 percent.

12. The process of claim 7 wherein the reaction temperature is $-70°$ to $+100°$ C.

\* \* \* \* \*